UNITED STATES PATENT OFFICE.

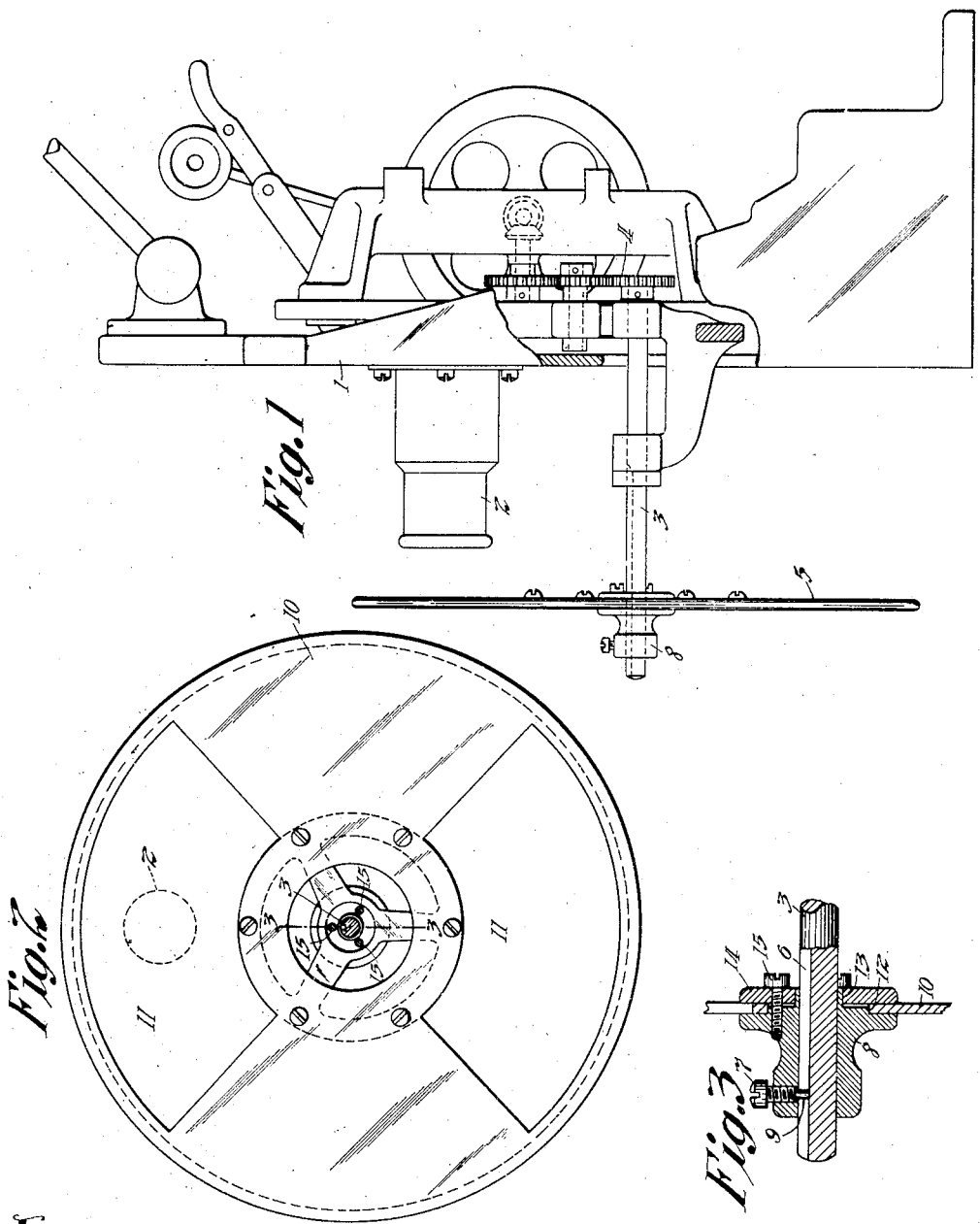

FERDINAND H. MAY, OF MONTCLAIR, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

MOTION-PICTURE-PROJECTING APPARATUS.

1,087,129. Specification of Letters Patent. Patented Feb. 17, 1914.

Application filed April 18, 1912. Serial No. 691,601.

*To all whom it may concern:*

Be it known that I, FERDINAND H. MAY, a citizen of the United States, and a resident of Montclair, in the county of Essex and State of New Jersey, have invented certain new and useful Improvements in Motion-Picture-Projecting Apparatus, of which the following is a description.

My invention relates to motion picture projecting apparatus and more especially to the shutter which passes before the objective to intemittently shut off the light rays projected therethrough.

The principal object of my invention is to provide a construction insuring the attachment of the shutter as a whole to its operating means, always in the same relative angular position with respect thereto, but which permits independent adjustment of the light intercepting portion or screen of the shutter in order to compensate for the framing or centering operations of the apparatus so that the light rays will be intercepted only during picture substitution or while the film is in motion.

Other objects of my invention will appear more fully in the following description and appended claims.

In order that my invention may be more clearly understood reference is made to the accompanying drawings forming a part of this specification, in which the same reference characters are used to designate corresponding parts throughout and in which—

Figure 1 is a view in side elevation, partly in section of a motion picture projecting apparatus with my improved shutter applied thereto; Fig. 2 is a front elevation partly in section of the device shown in Fig. 1, parts being omitted; and Fig. 3 is a section on line 3—3 of Fig. 2.

Referring to the drawings, reference character 1 designates a motion picture projecting apparatus of conventional type provided with the usual objective or lens holder 2. A rotary shutter shaft 3 is suitably driven from the film operating mechanism as by gearing 4 to which shaft is removably secured the intermittently light intercepting shutter 5. It is often necessary in apparatus of this type to remove the shutter for various reasons, e. g. for packing the machine and to get at the objective conveniently; and in machines as heretofore constructed much time is often wasted upon replacing the shutter and in adjusting and securing the same to the operating shaft in its previous relative angular position with respect thereto. In order to overcome this objection, I provide a suitable connection, preferably a splined connection, between shaft 3 and shutter 5 which permits of securing the shutter to the shaft in but one relative angular position. This splined connection preferably comprises a slot 6 in shaft 3 and a screw 7 in the hub 8 or shutter 5, the screw 7 having a portion 9 adapted to engage and slidingly fit in slot 6.

Reference character 10 represents the light intercepting portion or screen of the shutter which, as shown, is provided with two apertures 11 although it is of course understood that said screen may have one, three, or more such apertures if desired. Screen 10 is adjustably mounted on hub 9 in any suitable manner. A preferable way of so mounting said screen is to cut away hub 9 so as to form two annular bearing portions 12 and 13 to receive the light intercepting screen 10 and the clamping washer 14 respectively and to provide suitable means, such as screws 15 for connecting hub 9 and washer 14. It is evident that on loosening screws 15 screen 10 may be adjusted angularly to any desired position on hub 9 and on tightening the screws said screen will be rigidly clamped to said hub by the washer 14. By this adjustable connection between the hub 9 and screen 10 of the shutter I am enabled to correctly position the screen, after a framing or centering operation of the projecting apparatus, so that the light rays will be intercepted only when the film is being moved during picture substitution. Shutters, as so constructed, may be quickly and easily applied to almost all, if not all types of motion picture projection apparatus now in use.

Having now disclosed the nature of my invention and specifically described one embodiment thereof what I claim and desire to protect by Letters Patent is as follows:

1. In a motion picture projecting apparatus, the combination with a rotary shutter shaft, of a shutter comprising a hub, an apertured disk adjustable angularly on said hub, and means for securing said disks to said hub in any desired angular position with respect thereto, said hub and shaft being provided with a splined connection whereby the hub may be secured to said shaft in but one angular position with respect thereto, substantially as described.

2. In a motion picture projecting apparatus, the combination with a rotary shutter shaft provided with a longitudinal slot, of a shutter comprising a hub having a bore to receive said shaft, an apertured disk, and means for securing the disk to said hub whereby the disk may be adjusted and secured in any desired angular position with respect to said hub, said hub being provided with means coöperating with the slot in the shaft whereby the shutter may be secured to the shaft in but one angular position with respect thereto, substantially as described.

3. In a motion picture projecting apparatus, the combination with a shaft, of a shutter comprising a hub adapted to be secured to said shaft in but one angular position with respect thereto, an apertured disk adjustable angularly on said hub, and means for securing said disk to said hub in any desired angular position with respect thereto, substantially as described.

This specification signed and witnessed this 17th day of April, 1912.

FERDINAND H. MAY.

Witnesses:
WILLIAM A. HARDY,
ANNA R. KLEHM

---

Copies of this patent may be obtained for five cents each, by addressing the "Commissioner of Patents, Washington, D. C."

---

Corrections in Letters Patent No. 1,087,129.

It is hereby certified that in Letters Patent No. 1,087,129, granted February 17, 1914, upon the application of Ferdinand H. May, of Montclair, New Jersey, for an improvement in "Motion-Picture-Projecting Apparatus," errors appear in the printed specification requiring correction as follows: Page 1, line 12, for the word "intemittently" read *intermittently;* same page, line 66, for the word "or" read *of;* page 2, line 18, after the word "one" insert the word *relative;* and that the said Letters Patent should be read with these corrections therein that the same may conform to the record of the case in the Patent Office.

Signed and sealed this 10th day of March, A. D., 1914.

[SEAL.]

R. T. FRAZIER,
*Acting Commissioner of Patents.*